(12) United States Patent
Doré et al.

(10) Patent No.: US 9,175,663 B2
(45) Date of Patent: Nov. 3, 2015

(54) LINEAR GENERATOR FOR SUBMERGED USE AND A METHOD OF PRODUCING ELECTRIC ENERGY

(75) Inventors: Erik Doré, Ludvika (SE); Rafael Waters, Uppsala (SE); Fredrik Axelsson, Uppsala (SE)

(73) Assignee: Seabased AB, Uppsala (SE)

( * ) Notice: Subject to any disclaimer, the term of this patent is extended or adjusted under 35 U.S.C. 154(b) by 0 days.

(21) Appl. No.: 13/700,328

(22) PCT Filed: May 28, 2010

(86) PCT No.: PCT/SE2010/050587
§ 371 (c)(1),
(2), (4) Date: Jan. 31, 2013

(87) PCT Pub. No.: WO2011/149399
PCT Pub. Date: Dec. 1, 2011

(65) Prior Publication Data
US 2013/0127167 A1    May 23, 2013

(51) Int. Cl.
F03B 13/10 (2006.01)
F03B 13/12 (2006.01)
H02P 9/04 (2006.01)
F03B 13/18 (2006.01)
H02K 35/02 (2006.01)
H02K 41/03 (2006.01)

(52) U.S. Cl.
CPC ............ F03B 13/1885 (2013.01); H02K 35/02 (2013.01); H02K 41/03 (2013.01); Y02E 10/38 (2013.01)

(58) Field of Classification Search
USPC .......... 290/42, 53; 60/495–502; 417/331, 333
See application file for complete search history.

(56) References Cited

U.S. PATENT DOCUMENTS

| 3,487,228 | A | * | 12/1969 | Kriegel | 290/52 |
|---|---|---|---|---|---|
| 4,539,485 | A | * | 9/1985 | Neuenschwander | 290/53 |
| 6,020,653 | A | * | 2/2000 | Woodbridge et al. | 290/53 |
| 6,644,027 | B1 | * | 11/2003 | Kelly | 60/498 |
| 7,012,340 | B2 | * | 3/2006 | Yi | 290/42 |
| 7,242,106 | B2 | * | 7/2007 | Kelly | 290/42 |
| 2010/0084869 | A1 | * | 4/2010 | Leijon et al. | 290/53 |
| 2010/0117367 | A1 | * | 5/2010 | Muller et al. | 290/53 |

FOREIGN PATENT DOCUMENTS

| WO | 03058055 | | 7/2003 |
|---|---|---|---|
| WO | WO 2008116621 A1 | * | 10/2008 |
| WO | WO 2010024740 A1 | * | 3/2010 |
| WO | 2010024740 | | 4/2010 |

* cited by examiner

Primary Examiner — Tulsidas C Patel
Assistant Examiner — Charles Reid, Jr.
(74) Attorney, Agent, or Firm — Dykema Gossett PLLC

(57) ABSTRACT

A linear generator for submerged use in generating electricity has a linearly reciprocating translator which is attached to a wire and a rod arranged to connect the translator to a floating body on the sea surface. The generator has a sealed housing forming a watertight chamber in which the translator is located. The rod is arranged to pass through a sealed opening in a wall portion of the housing. When operated, the wall portion with the sealed opening is located at a level that is below the level of the upper end of the translator at least during a part of the movement of the translator.

17 Claims, 4 Drawing Sheets

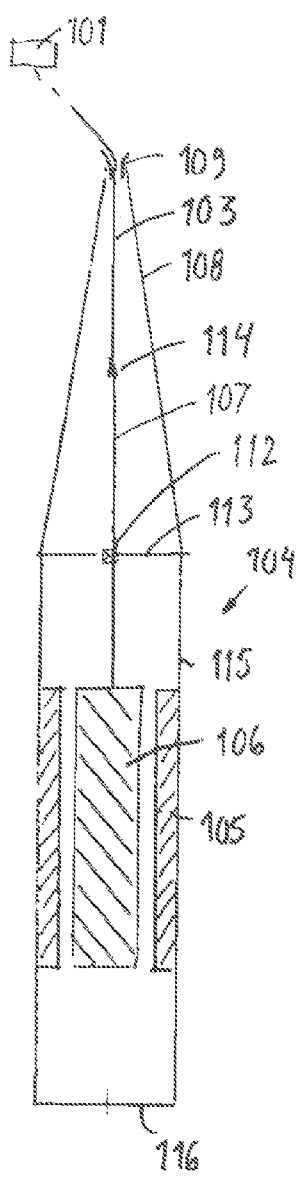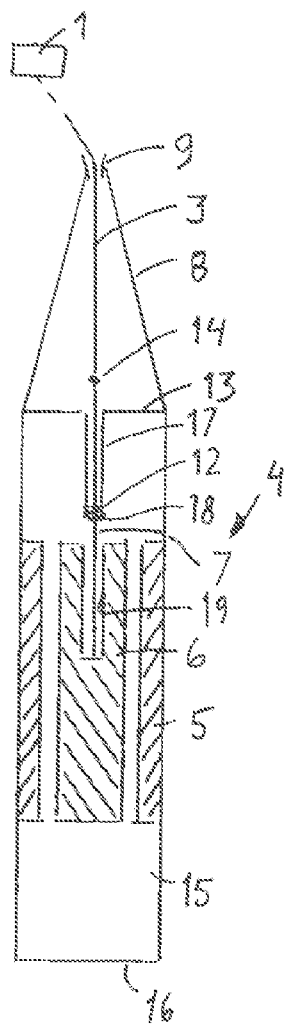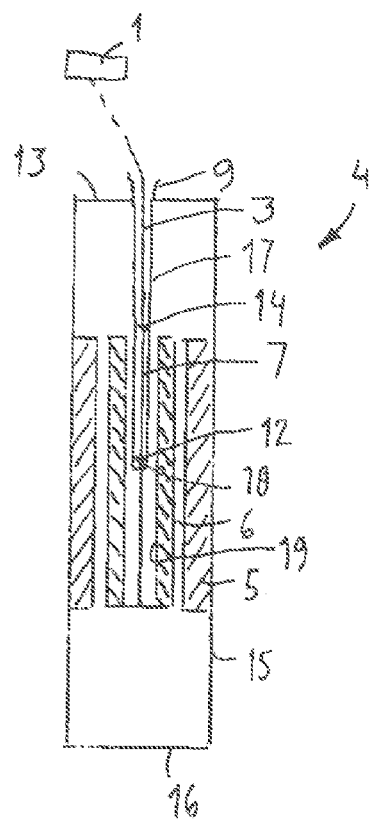
Fig. 2 prior art
Fig. 3
Fig. 4

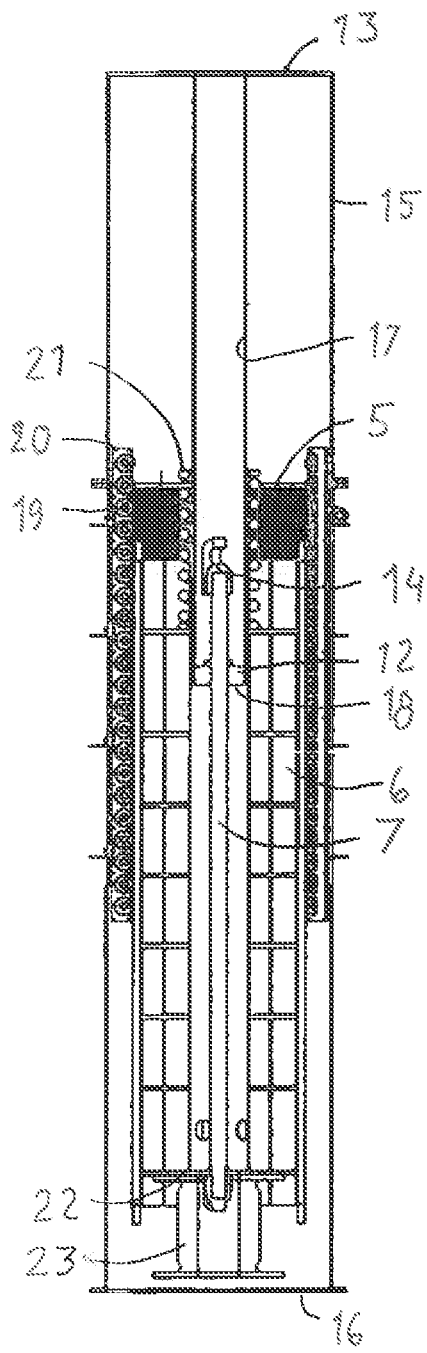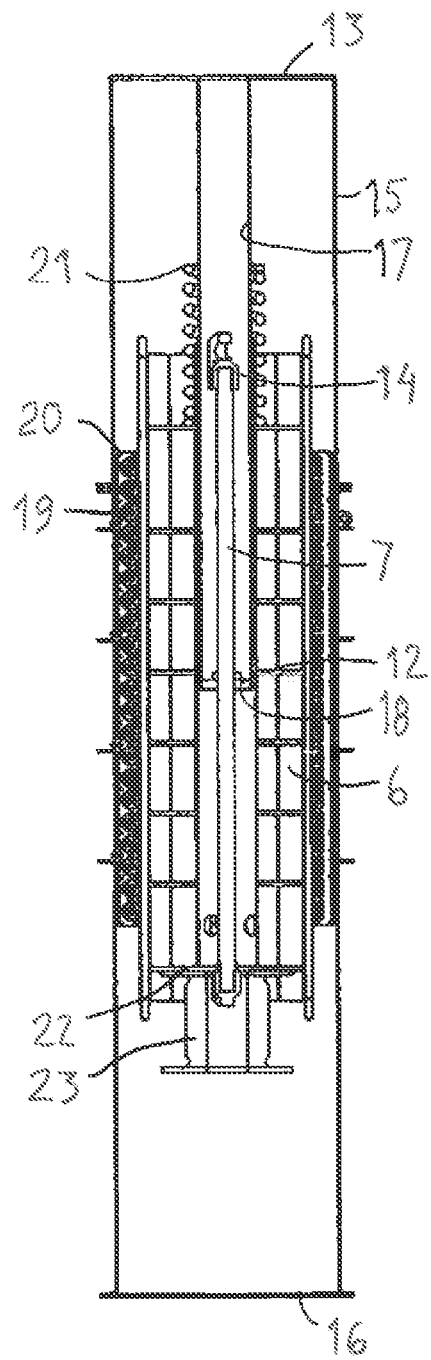

ively. This means that the station has to have a sufficient height above the water-tight housing of the generator to allow the reciprocation of the rod. At the upper end there is required some kind of device to adapt the often inclined wire to linear reciprocating movement of the rod. This means that the station requires a considerable building height above

LINEAR GENERATOR FOR SUBMERGED USE AND A METHOD OF PRODUCING ELECTRIC ENERGY

FIELD OF INVENTION

The present invention in a first aspect relates to a linear generator for submerged use in a sea and having a stator and a linearly reciprocating translator, which translator is attached to connection means arranged to connect the translator to a floating body on the sea surface, the generator having a sealed housing forming a water-tight chamber in which the translator is located, which connection means is arranged to pass through a sealed opening in a wall portion of the housing.

In a second aspect the invention relates to a use of a wave power unit provided with such a linear generator.

In a third aspect the invention relates to a method of producing electric energy by providing a submerged linear generator with a reciprocating translator, enclosing the generator in a water-tight housing, anchoring the linear generator to a sea bottom, providing at least one floating body to float on the sea surface, connecting the at least one floating body to the translator by connection means, arranging an opening having a sealing in a wall portion of the housing and arranging the connection means to pass through the opening.

In the present application the terms "radial", "axial", "lateral" and the like refer to the direction of the axis defined by the reciprocating movement of centre of the translator, i.e. the centre axis if not explicitly otherwise is stated. The terms "upper" and "lower" refer to the vertical direction and relates to the locations of the components in question when the wave-power unit is in operation.

BACKGROUND OF INVENTION

Wave movements in the sea and in large inland lakes constitute a potential source of energy that has scarcely been exploited so far. However various suggestions have been made to use the vertical movements of the sea for producing electrical power in a generator. Since a point on the sea surface makes a reciprocating vertical movement it is suitable to use a linear generator to produce the electric power.

WO 03/058055 discloses such a wave power unit where the moving part of the generator, i.e. the part that corresponds to the rotor in a rotating generator and in the present application called translator, reciprocates in relation to the stator of the generator. In that disclosure the stator is anchored in the sea bed. The translator is by flexible connection means, such as a wire, cable or a chain connected to a body floating on the sea.

In such known wave power units the linear generator is encapsulated in a water-tight housing which forms a part of the submerged station. The wire is connected to the translator at the upper end thereof via a rod that passes through a sealed opening in the housing. To connect the wire to the translator via a rod is important for obtaining a good sealing and in order to provide maximal alignment with the translator movements. By the wave movements acting on the floating body, the translator reciprocates up and down since the movement is transferred by the wire and the rod. The rod thus reciprocates correspondingly. This means that the station has to have a sufficient height above the water-tight housing of the generator to allow the reciprocation of the rod. At the upper end there is required some kind of device to adapt the often inclined wire to linear reciprocating movement of the rod. This means that the station requires a considerable building height above the generator. This results in a large height of the complete submerged station such that it will be tower-like.

Since the floating body is connected to the generator by a wire or the like, it has a certain degree of freedom to drift laterally in relation to the submerged station. Lateral forces from the wire will thereby act on the upper end of the submerged station. This results in bending forces on the tower-like construction urging the tower to tilt. The part of the submerged station that is above the generator thereby contributes to increasing the momentum of the tilting forces. The high tilting forces might disturb the performance of the generator. Measures to cope with the tilting momentum are therefore required. The part of the submerged station above the generator also adds to the total construction material that is required.

SUMMARY OF INVENTION

The object of the invention is to reduce the drawbacks related to a large construction height of the submerged station of a wave power unit.

This object is according to the first aspect of the invention achieved in that a linear generator of the kind specified includes the specific features that, at operation, the wall portion with sealed opening is located at a level that is below the level of the upper end of the translator, at least during a part of the movement of the translator.

Movement of the generator is defined as the maximal movement the translator is allowed to undergo between an upper and a lower end position. It is to be understood that, during operation, the linear generator is positioned with the centre axis along which the translator reciprocates vertically.

Traditionally the sealed opening has been located at a top wall of the water-tight housing, i.e., above the complete generator. It is thus above the upper end of the translator in any axial position thereof. By arranging the sealed opening lower, such that it at least during a part of the translator movement it is below the upper end of the translator, the portion of the connection means that has to be linearly guided will be located at a lower level and at least partially overlap the generator in the axial direction.

Employing the invented linear generator to a wave power unit therefore makes it possible to have a reduced or even eliminated building construction height above the generator, thereby eliminating or reducing the drawbacks of a such as described above. Using a linear generator according to the invention thereby will lead to lower building costs and better performance in this context.

According to a preferred embodiment of the invention, the wall portion with the sealed opening is located below the upper end of the translator during a major part of the movement of the translator.

This represents an embodiment in which the linearly movement of the guided part of the connection means to a large extent overlaps the axial extension of the generator. Thereby the advantages mentioned above become more accentuated, since this implies a considerable reduction of the height of the construction above the generator.

According to a further preferred embodiment the wall portion with the sealed opening is located below the upper end of the translator during the complete movement thereof.

By this embodiment the advantages are gained to their maximal extent. This embodiment completely eliminates the need for a guiding construction above the generator.

According to a further preferred embodiment the connection means includes a rigid rod arranged to pass through the sealed opening.

In most cases it is convenient that the major part of the connection means is flexible connection means, such as a wire. It is in principle possible that the part of the connection means that passes through the sealed opening also is a wire. However, by making this part as a rod, it is easier to obtain an efficient sealing at the opening. A rod also provides a better adaption to the linear movement of the translator.

According to a further preferred embodiment the translator is attached to the connection means at the lower half of the translator.

This is an advantageous and simple way of providing this attachment such that the sealed opening can be located at the low position according to the present invention.

According to a further preferred embodiment the translator is attached to the connection means at the lower end of the translator.

This facilitates to arrange the sealed opening as low as possible, which as has been explained above optimizes the possibility to reduce or eliminate the structure of the submerged station that is above the generator.

According to a further preferred embodiment the connection means is attached to the translator by attachment means including a plate-shaped member attached to the bottom end surface of the translator.

The attachment thereby will be safe and simple. In the upwards movement the plate-shaped member will push the translator upwards, i.e., the units are pressed together with practically no risk of breakage. A similar safe force transfer occurs during the downward movement when the translator by its weight pushes the plate-shape member downwards. Thus, in principle the translator could simply rest on the plate-shaped member. This allows small requirements on the means by which the plate-shaped member is fastened to the end surface of the translator and this can therefore be done in a simple way.

According to a further preferred embodiment the translator has a central axial hole, and the wall portion with the sealed opening is located within the hole, at least during a part of the translator movement.

This is a practical and advantageous realization of the idea of the low position of the sealed opening. The centered arrangement results in a symmetric distribution of the dynamic forces, and only one connection means has to be attached to the translator.

According to a further preferred embodiment, the housing has an outer circumferential wall, a bottom end wall, a top end wall, an inner circumferential wall and the wall portion, the inner circumferential wall extending downwards from a hole in said top end wall and having a bottom formed by the wall portion. This embodiment is also particularly suitable when the translator is on the inside of the stator, which in most applications is preferred.

This shape of the housing advantageously is adapted for providing a low localization of the sealed opening.

According to a further preferred embodiment, the outer and inner circumferential walls both are circular-cylindrical and coaxial with the centre axis of the movement of the translator.

This further contributes to attain a symmetrical arrangement with an optimized balancing of the forces.

According to a further preferred embodiment the axial extension of the translator is larger than the axial extension of the stator.

Since the translator reciprocates relatively to the stator, an equal length of these would result in that only a part of the stator is axially in the area of the translator during large parts of the translator strokes. Only this part of the stator thereby is activated. When the translator is longer than the stator, the stator will be activated during a larger part of each stroke. The low located position of the sealed opening makes it possible to have a relatively long translator without the drawback of an increased height of the building structure above the generator. When the period during which the complete stator is activated is increased, the amount electric energy induced in the stator winding is increased such that the output from the generator is improved.

According to a further preferred embodiment the axial extension of the translator is as least as large as the sum of the axial extension of the stator and the maximal stroke length of the translator.

With such a length of the translator the stator will all the time be completely located axially around the translator, provided that the stator is axially located in the neutral, i.e., axial middle position, of the translator. The output from the generator therefore will be at maximum. By the maximal stroke length is meant the length of the movement of the translator from one end position to the other end position when the wave movements are at a height corresponding to what the generator is designed to allow. This is determined by means in the housing that defines end stops for the translator.

The invention also relates to a wave power unit including at least one floating body and a submerged linear generator with a stator and a translator, and further includes connection means connecting the at least one floating body to the translator, the connection means including flexible connection means, whereby the linear generator is according to the present invention, in particular to any of the preferred embodiments hereof. By flexible is meant that the connection means is bendable, such as a chain, wire, rope or the like. It does not necessarily means that it is flexible in the longitudinal direction.

The invention also relates to a wave power plant including a plurality of wave power units according to the present invention. Further the invention relates to an electric network that includes a connection to at least one wave power unit according to the present invention.

In the second aspect of the invention, the invented wave power unit is used for producing electric power and supplying the electric power to an electric network.

In the third aspect of the invention, the object is met in that the method of the introductionally specified kind includes the specific measures of arranging the sealed opening at a level that is below the level of the upper end of the translator at least during a part of the movement of the translator.

According to preferred embodiments of the invented method a linear generator according to the present invention, in particular to any of the preferred embodiments thereof, is provided.

The invented wave power unit, the invented wave power plant, the invented electric network, the invented use and the invented method all have advantages corresponding to those of the invented linear generator and the preferred embodiments thereof and which have been described above.

The above described preferred embodiments of the invention are specified in the dependent claims. It is to be understood that further preferred embodiments of course can be constituted by any possible combination of the preferred embodiments above and any possible combination of these and features mentioned in the description of examples below.

The invention will be further explained through the following detailed description of examples thereof and with reference to the accompanying drawings.

SHORT DESCRIPTION OF THE DRAWINGS

FIG. 1. is a side view of a wave power unit according to prior art.

FIG. 2 is a section through a detail of FIG. 1.

FIGS. 3 and 4 are sections similar to that of FIG. 2 but illustrating examples according to the invention.

FIGS. 5-7 are sections more in detail of the example in FIG. 4 and illustrates three different positions of the translator.

DESCRIPTION OF EXAMPLES

Figure 1:
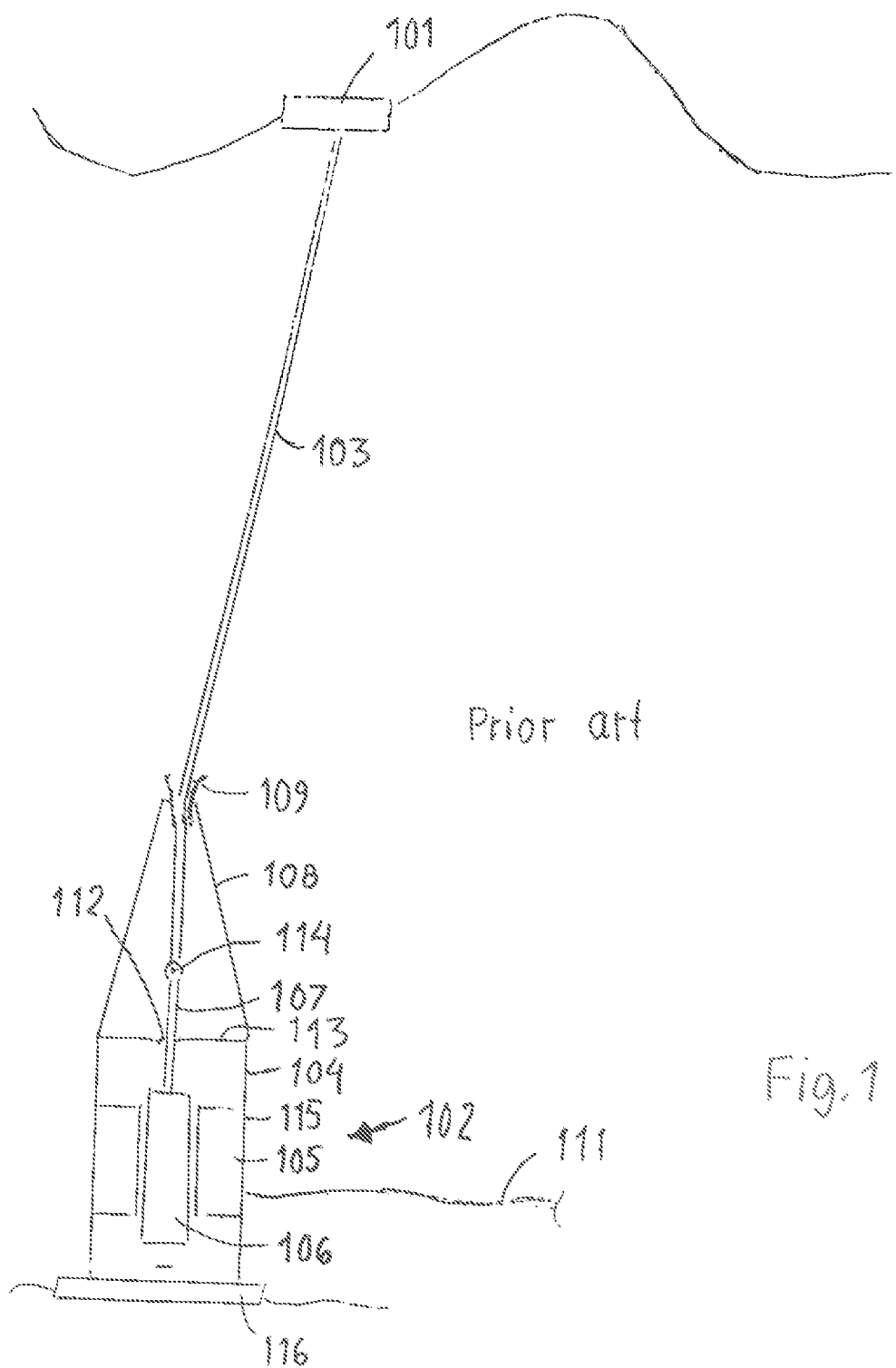

FIG. 1 is a side view of a wave-power unit according to prior art at operation in the sea. A floating body 101 floats on the sea surface and is connected by a connection means 103 such as a cable, wire, rope, chain or the like, to a linear generator 102 anchored at the sea bed. In the figure the generator is attached at the sea bed. It is, however, to be understood that the generator can be located above the sea bed and be anchored in some other way.

The linear generator 102 has a stator 105 with windings and a translator 106 with magnets. The translator 106 is able to reciprocate up and down within the stator 105 thereby generating current in the stator windings, which current by an electric cable 111 is transferred to an electric network.

The translator 106 is via a rod 107 attached to the wire 103 by means of a joint 114. When the floating body 101, due to the wave movements of the sea surface, is forced to move up, the floating body will pull the translator 106 upwards. When the floating body thereafter moves down the translator 106 will move down through gravity. Optionally, but preferably, a spring (not shown) or the like acting on the translator 106 provides an additional force downwards.

The stator 105 and the translator 106 are enclosed in a water-tight housing 104 having a circumferential cylindrical wall 115, an upper end wall 113 and a lower end wall 116. An opening with a seal 112 is provided in the upper end wall 113 to allow the rod 107 to reach into the interior of the housing and to reciprocate through the sealed opening.

Since the generator 102 is anchored in the sea bed and the floating body 101 floats freely on the water surface, the floating body is free to move laterally in relation to the generator 102. Thereby the connection means 103 will become inclined.

Above the water-tight housing 104 there is provided a guiding device 109 that guides the wire 103 to move vertically below the guiding device 109 while allowing the wire 3 that is above the guiding device 109 to move in an inclined position. The guiding device 109 is attached to a conical construction 108 on the top of the water-tight housing 104.

The guiding device 109 allows the wire to gradually change its direction when passing through guiding device 109, such that the wear of the connection means becomes limited.

The above described example of prior art is in its general principle similar to that of the present invention. The differences, as will be explained further in relation to FIGS. 2-3, are mainly the location of the sealing 112 and the height or even the presence of the conical construction above the water-tight housing 104.

FIG. 2 also depicts a linear generator according to the prior art of the kind described in connection with FIG. 1 and is used for an illustrative comparison with the two examples of a linear generator according to the invention shown in FIGS. 3 and 4. Here, the stator 5 and the translator 6 are enclosed in a watertight housing 4 having a circumferential cylindrical wall 15, an upper end wall 13 and a lower end wall 16. In all three figures the translator is in its middle position.

In the example of FIG. 3, the upper end wall 13 does not have a sealed opening as in the prior art example of FIG. 2. Instead a centrally arranged pipe extends down from the upper end wall 13. The pipe is formed by an inner circumferential wall 17, coaxial with the outer circumferential wall 15 and ending in a wall portion 18 at the bottom of the pipe. In the wall portion 18 at the bottom of the pipe there is an opening with a seal 12 through which extends the rod 7 that connects the translator 6 to the wire 3. The rod 7 is connected to the wire 3 by a joint 14.

The lower end of the rod 7 is connected to the translator at the bottom of a central cavity 19 thereof. The cavity 19 has a diameter that is larger than the diameter of the circumferential wall 17. And the length of the cavity 19 is at least as large as the length of the pipe. From the middle position illustrated in the figure, the translator reciprocates up and down, and in the uppermost end position the pipe will extend almost completely into the cavity.

Since the sealed opening 12 is at a lower relative position in comparison with the sealed opening 112 in FIG. 2, the rod 7 in its uppermost position does not reach as high as the rod 107 in FIG. 2 in the corresponding position. The guiding device 9 thereby can be located correspondingly lower than the guiding device in FIG. 2. The structure 8 above the water-tight housing 4 is thus shorter than the corresponding structure 108 in FIG. 2, which leads to an overall reduced height of the unit.

FIG. 4 illustrates a further example according to the invention. The device of FIG. 4 is similar to that of FIG. 3 in most respects, but the pipe with the sealed 12 bottom wall 18 is longer and has a length that equals the length of the translator 6. Furthermore, the rod 7 is attached to the lower end of the translator 6. In the upper end position, the translator 7 thereby completely overlaps around the wall 17 of the pipe. And in that position the joint 14 between the wire 3 and the rod 7 is at about the same level as the upper end of the water-tight housing 4. This enables the guiding device 9 to be located at a still further lower relative position. In this example a construction above the water-tight housing 4 for mounting the guiding device is superfluous. The guiding device can be mounted directly at the upper end wall 13 of the water-tight housing 4. Thus the total height of the unit is still further reduced, and corresponds solely to the height of the water-tight housing 4.

The example of FIG. 4 thereby applies the principle of the present invention to its full extent, whereas the example of FIG. 3 represents a compromise that might be used in case implied by other considerations. It is to be understood that the relative position of the wall 18 can be anywhere between the illustrated positions.

Figure 7:
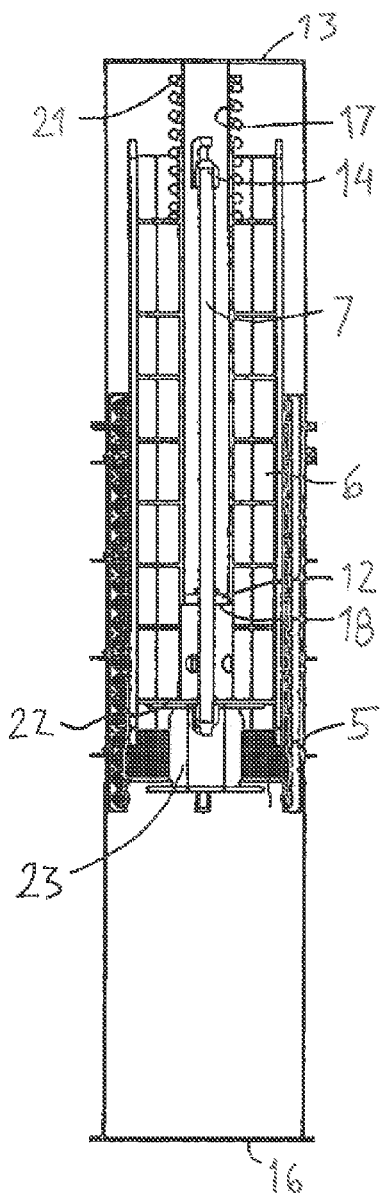

FIGS. 5, 6 and 7 are somewhat more detailed representations of the device shown in FIG. 4 and illustrate the device in three different positions of the translator 6, the lower end position (FIG. 5), the middle position (FIG. 6) and the upper end position (FIG. 7). In these longitudinal sections, the stator 5 is not visible at the sides of the translator 6, but behind it in FIGS. 5 and 7. The movement of the translator 6 is guided by a system of wheels 19 arranged in a couple of vertical rows, each row of wheels 19 being mounted in a frame 20. The frames 20 are attached to the wall 15 of the housing, and the translator 6 roll on the wheels 19. At the upper end of the translator 6 a dampening spring 21 is mounted, and a damper 23 is also provided at the lower end of the translator 6.

The rod 7 is attached to the lower end of the translator by means of a plate 22. In FIGS. 5-7, the wire connected to the rod 7 at the joint 14 is left out.

As can be seen in the figures the sealed 12 bottom wall 18 is located a small distance below the upper end of the translator 6 when it is in its upper end position, is located at the middle of the translator 6 in its middle position and a short distance above the lower end of the translator 6 in its lower end position. In all three positions the joint 14 is located below the upper end wall 13 of the water-tight housing.

Figure 9:
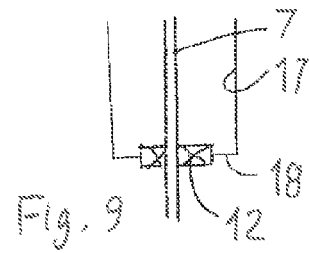
FIG. 9 is an alternative example of the detail shown in FIG. 8.
Figure 8:
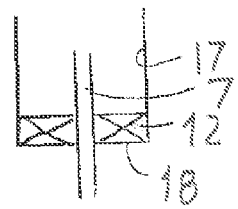
FIG. 8 is a section through a detail of FIGS. 4-8.

FIG. 8 in an enlarged section illustrates the sealed opening. The seal 12 has an outer diameter corresponding to the diameter of the wall 17 and thus is mounted directly in that wall. The bottom end surface of the seal 12 thus constitutes the wall portion 18 at the bottom of the pipe. In the example of FIG. 9, the seal has a smaller diameter and is mounted in the wall portion 18 at the bottom of the pipe.

Figure 10:
FIG. 10 is a schematic illustration of a detail of an alternative example.

In FIG. 10 is illustrated an example where the translator 6 is longer than the stator. The translator is shown in the upper end position (full lines) and in the lower end position (broken lines). As can be seen the length of the translator corresponds to the sum of the stator length and the stroke length of the translator.

Figure 11:
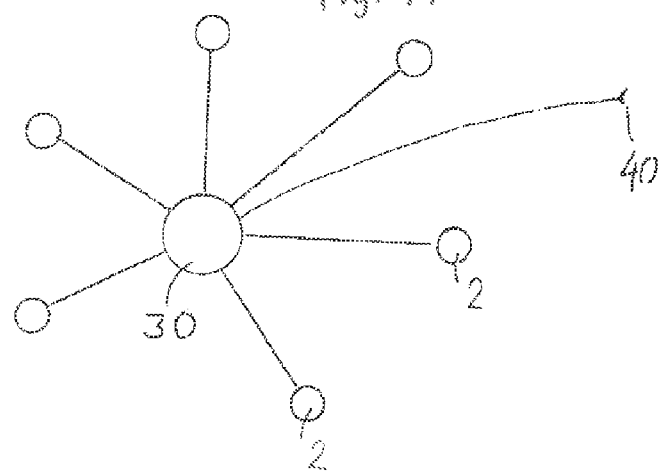
FIG. 11 is a schematic illustration of a plant according to the invention.

FIG. 11 in a view from above schematically illustrates a wave power plant having a plurality of wave power units with generators of the kind described above. The generators 2 of these units are all connected to a submerged switchgear 30 connected to an electric network 40.

The invention claimed is:

1. A linear generator for use in a body of water which comprises:
    a sealed housing which has an upper end wall, a lower end wall and a side wall which extends between said upper and lower end walls and defines a water-tight chamber therein, a recessed portion of said upper end wall extending downwardly and having a bottom end with a sealed opening,
    a stator with windings located in said water-tight chamber, and
    a translator with magnets in said water-tight chamber and vertically movable relative to said stator to generate electricity, said translator being connectable to a connection means which extends through said sealed opening to a floating body on said body of water, said translator defining an upper end and a vertical cavity that extends downwardly from said upper end, in use said vertical cavity being cyclically movable about said recessed portion as said translator is vertically moved such that the bottom end of said recessed portion will be located below said upper end of said translator during a portion of an up-and-down movement cycle.

2. The linear generator according to claim 1, wherein the bottom end with the sealed opening is located below the upper end of the translator during a major part of a movement cycle.

3. The linear generator according to claim 2, wherein the bottom end with the sealed opening is located below the upper end of the translator during a complete movement cycle of the translator.

4. The linear generator according to claim 1, wherein the vertical cavity in the translator comprises a central axial through hole, and the bottom end with said sealed opening is located within said through hole during at least a part of the a movement cycle of the translator.

5. The linear generator according to claim 1, wherein the outer and inner circumferential walls both are circular-cylindrical and coaxial with the centre axis of the movement of the translator.

6. The linear generator according to claim 1, wherein axial extension of the translator is larger than axial extension of the stator.

7. The linear generator according to claim 6, wherein the axial extension of the translator is larger than a sum of the axial extension of the stator and half maximal stroke length of the translator.

8. A wave power plant, wherein the wave power plant includes a plurality of wave power units according to claim 1.

9. An electrical network, including at least one wave power unit according to claim 1.

10. The linear generator according to claim 1, wherein said recessed portion of said upper end wall is cylindrical.

11. The linear generator according to claim 1, including said floating body and said connection means which extends from said translator to said floating body.

12. The linear generator according to claim 11, wherein the connection means includes a rigid rod arranged to pass through said sealed opening.

13. The linear generator according to claim 11, wherein the translator is attached to the connection means at a lower half of the translator.

14. The linear generator according to claim 13, wherein the translator is attached to the connection means at lower end of the translator.

15. The linear generator according to claim 11, wherein the connection means is attached to the translator by attachment means including a plate-shaped member attached to a bottom end surface of the translator.

16. The linear generator according to claim 1, wherein said side wall is circular-cylindrical in shape.

17. A method of producing electrical energy comprising the steps of: providing a linear generator comprising a sealed housing which has an upper end wall, a lower end wall and a side wall which extends between said upper and lower end walls and defines a water-tight chamber therein, a recessed portion of said upper end wall extending downwardly and having a bottom end with a sealed opening; a stator with windings located in said water-tight chamber; and a translator with magnets in said water-tight chamber and vertically movable relative to said stator to generate electricity, said translator defining an upper end and a vertical cavity that extends downwardly from said upper end, said vertical cavity being movable about said recessed portion as said translator is vertically moved, such that the bottom end of said recessed portion will be located below said upper end of said translator during a portion of an up-and-down movement cycle; anchoring the linear generator to a sea bottom; positioning at least one floating body on the sea surface; and extending connection means through said sealed opening to attach said at least one floating body to said translator, such that movement of said at least one floating body will provide an up-and-down movement cycle of said translator and generate electricity.

* * * * *